J. Havens,
Stump Elevator.
N° 77,879. Patented May 12, 1868.

Witnesses:
Ja A Loughborough
J S Seaman

Inventor:
J Havens
By Mad S Loughborough
Atty

United States Patent Office.

JESSE HAVENS, OF AUBURN, NEW YORK, ASSIGNOR TO HIMSELF AND GEORGE PALMER, OF THE SAME PLACE.

Letters Patent No. 77,879, dated May 12, 1868.

IMPROVEMENT IN STUMP-EXTRACTOR.

*The Schedule referred to in these Letters Patent and making part of the same.*

TO ALL WHOM IT MAY CONCERN:

Be it known that I, JESSE HAVENS, of Auburn, in the county of Cayuga, and State of New York, have invented a new and useful Machine for Pulling Stumps; and I do hereby declare that the following is a full, clear, and exact description thereof, reference being had to the accompanying drawings, making part of this specification, in which—

Like letters indicate corresponding parts in both figures.

The nature of this invention consists mainly in providing a sort of "cone-shaft," composed of two cylindrical sections of unequal diameter, around which the ends of the lifting-chains are wound, after passing through the ordinary tackle-block; and as it is unwound from the smaller section it is wound upon the larger one, which produces the leverage or power by reducing the speed.

To enable others to make and use my invention, I will describe its construction and operation.

Figure 1:
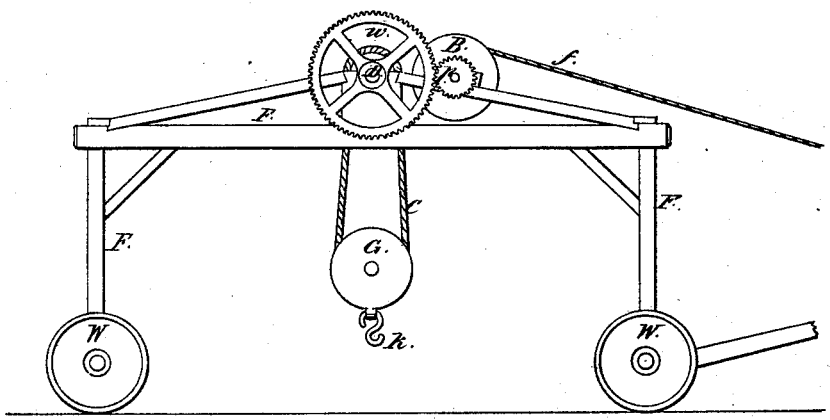
Figure 1 is a side elevation of my invention.
Figure 2:
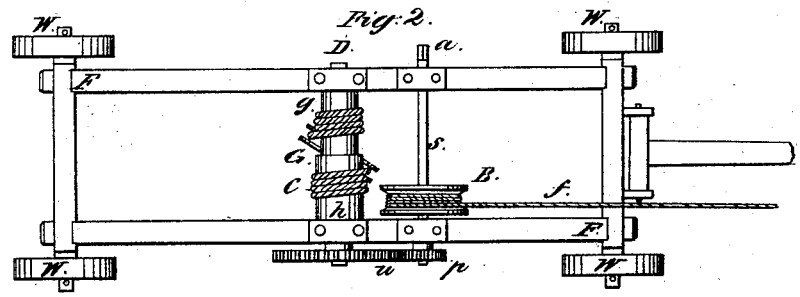
Figure 2 is a top view of the same.

I provide a suitable supporting-arch or frame, F, which may be mounted upon truck-wheels, W, if desired, for convenience in transporting. In the centre of this frame I mount the cone-shaft D, which consists of two sections, $g$ and $h$, of unequal diameter, as shown in fig. 2. The ends of the lifting-chain C are attached to these sections, and wound up in opposite directions, in order that when either is being unwound the other will be wound up. There is a large spur-wheel, $w$, attached to one end of the cone-shaft, to gear into the pinion $p$ of the crank-shaft $s$. There may be a drum, B, hung on this shaft, upon which a quantity of rope, $f$—or a chain may be used—may be wound. If desired, this drum B might be attached to the cone-shaft, which, of course, would considerably reduce the leverage or power of the machine. This leverage may be increased or diminished by reducing or increasing the difference in the diameter of the two sections of the cone-shaft.

A crank may be applied to the shaft $s$ at $a$, and the stump, or other weight or substance to be raised, may be raised by hand, but ordinarily there should be a horse attached to the rope $f$, and as he travels off the shafts are turned, and whatever may be attached to the hook $k$ is raised.

The lifting-chain C may be attached to the large and small sections of the cone-shaft, near the outer ends, or next to the frame F, in order that as the chain is unwound from the small section it will be wound upon the large one, the coils of the rope or chain following each other in the same direction along the shaft.

The supporting-frame may be made of any desired height, &c.

What I claim as my invention, and desire to secure by Letters Patent, is—

The differential cylindrical shaft D, tackle-block G, and the rope C, in combination with the frame, substantially in the manner and for the purposes herein shown and described.

JESSE HAVENS.

Witnesses:
L. C. MUNN,
H. C. MUNN.